April 7, 1925.
R. A. GUYMON
1,532,583
COMBINED TAIL LIGHT AND DIRECTION INDICATOR
Filed April 10, 1924    2 Sheets-Sheet 1
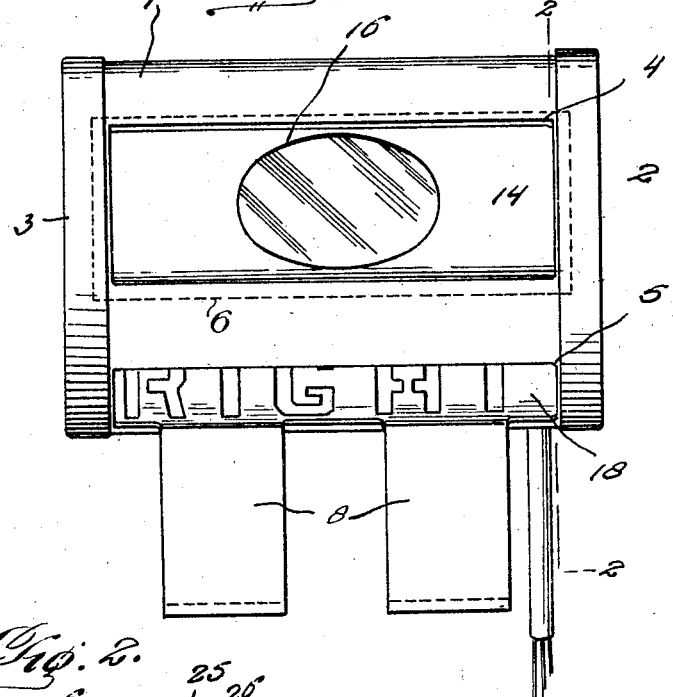
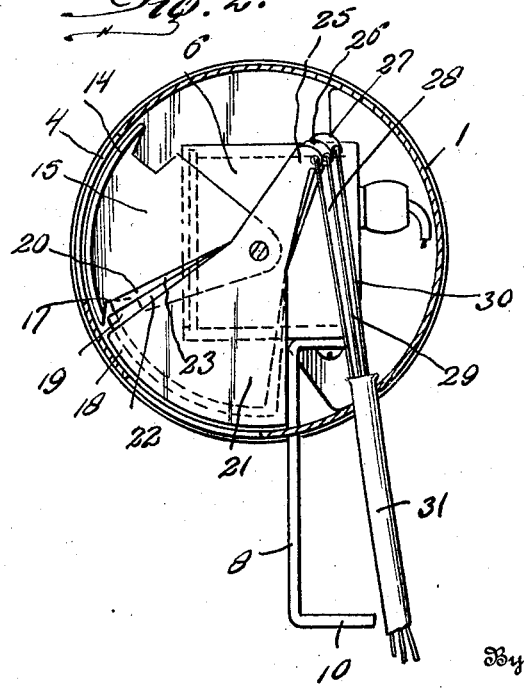
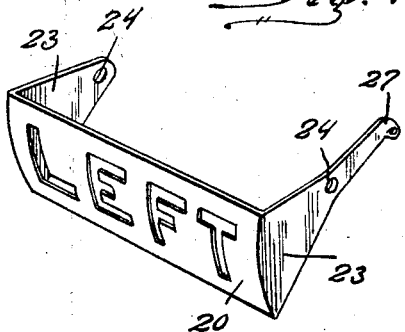
R. A. Guymon,
Inventor
By *Clarence O'Brien*
Attorney April 7, 1925.  1,532,583
R. A. GUYMON
COMBINED TAIL LIGHT AND DIRECTION INDICATOR
Filed April 10, 1924  2 Sheets-Sheet 2
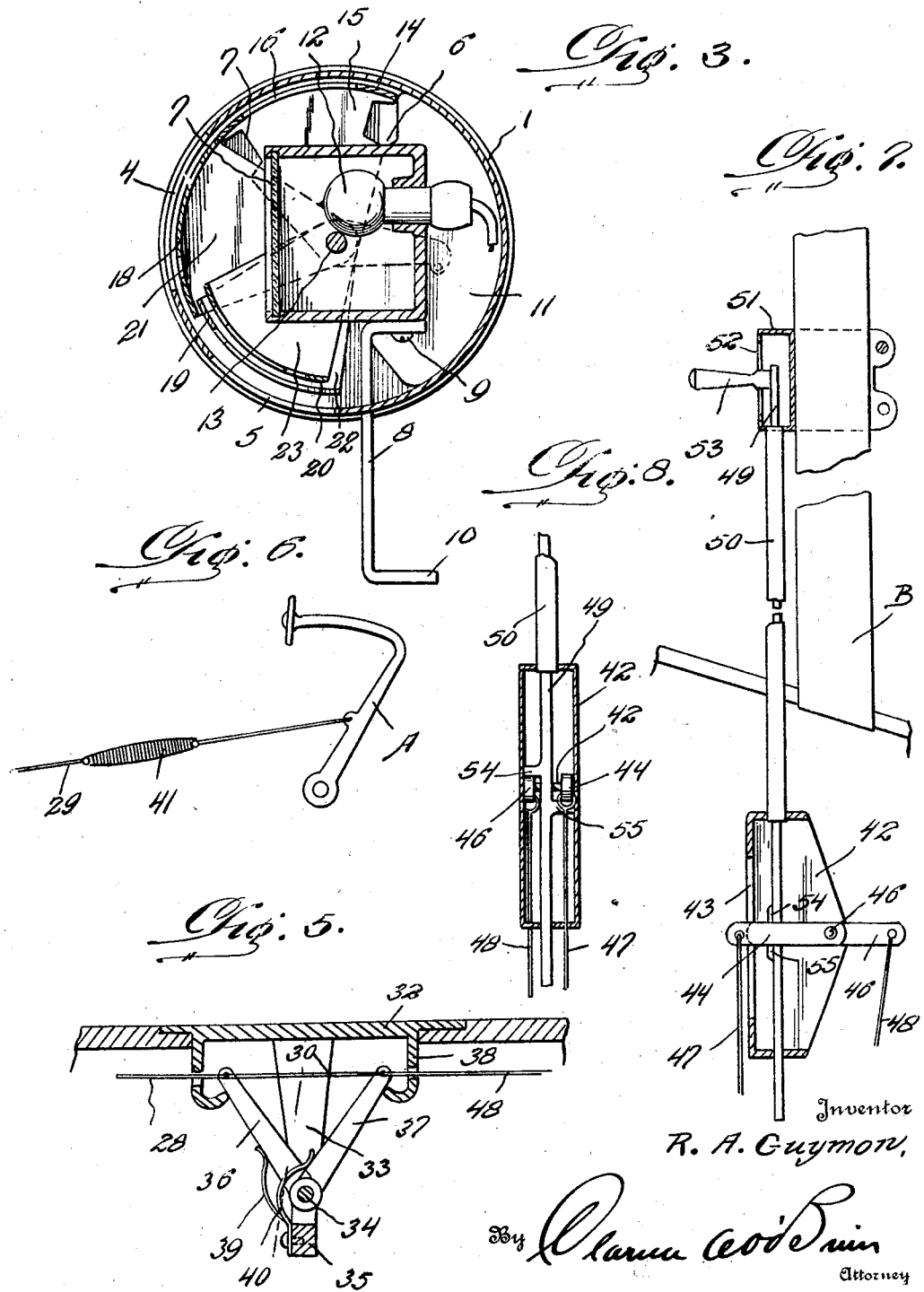

Patented Apr. 7, 1925.

1,532,583

UNITED STATES PATENT OFFICE.

RALPH A. GUYMON, OF SPRINGFIELD, ILLINOIS.

COMBINED TAIL LIGHT AND DIRECTION INDICATOR.

Application filed April 10, 1924. Serial No. 705,552.

*To all whom it may concern:*

Be it known that I, RALPH A. GUYMON, a citizen of the United States, residing at Springfield, in the county of Sangamon and State of Illinois, have invented certain new and useful Improvements in Combined Tail Lights and Direction Indicators, of which the following is a specification.

This invention relates to new and useful improvements in attachments for automobiles and it is principally adapted to provide a combined tail light and direction indicator which may be conveniently mounted on the rear of the automobile, means being provided within access of the operator of the vehicle to actuate the proper signal so as to indicate to the vehicles behind of the direction in which the vehicle upon which the signal is mounted is to follow.

Another important object of the invention is to provide a device of the above mentioned character, wherein the same provides a means for normally providing a tail light, further means being associated therewith whereby a signal may be given to indicate the direction in which the automobile is about to travel, also providing a means for supporting and illuminating the license plate.

A still further object of the invention is to provide a combined tail light and direction indicator wherein the construction is such as to enable the various signal members to be actuated independently of each other so as not to confuse the automobiles or vehicles in the rear as to the direction to be followed by the automobile upon which the device is mounted.

A still further object of the invention is to provide a vehicle direction indicator and actuating means therefor which includes a means for limiting the movement of the actuating means whereby the proper signal may be given so as to permit the same to be visible to the pursuing vehicles.

A further object of the invention is to provide a device of the above mentioned character, which is simple in construction, inexpensive, strong and durable, and further well adapted for the purposes for which it is designated.

Other objects and advantages of this invention will become apparent during the course of the following description.

In the accompanying drawings forming a part of this specification and in which like numerals designate like parts throughout the same:

Figure 1 is a front elevation of the device showing the shutter in position over the opening.

Figure 2 is a sectional view taken on line 2—2 of Figure 1.

Figure 3 is a central vertical section of the device showing one of the signal members in position over the opening.

Figure 4 is a detail perspective view of one of the signal elements.

Figure 5 is a fragmentary sectional view of the safety block.

Figure 6 is a fragmentary detail view of a brake lever with the stop signal control wire connected thereto.

Figure 7 is a fragmentary detail view of the signal actuating means with parts shown in section.

Figure 8 is a detail view of the lever actuating means.

In the drawings wherein for the purpose of illustration is shown the preferred embodiment of my invention, the numeral 1 designates a substantially cylindrical casing which is provided with the end closures 2 and 3 respectively. The casing 1 has an enlarged opening 4 provided in the front side thereof, and this opening extends for substantially the entire length of the casing. A similar opening 5 is provided in the bottom portion of the casing and the purpose of these openings will be hereinafter more fully described.

Supported within the cylindrical casing 1 in the back portion thereof, is the lamp housing 6 which has its front sides provided with transparent covers 7. For the purpose of supporting the lamp housing 6 in a rigid position within the casing 1, I provide the supporting brackets 8, the upper ends of which are secured in any suitable manner, such as is shown at 9 in the drawings, to the bottom of the rear portion of the lamp housing adjacent the respective ends thereof, the intermediate portions of the supporting brackets 8 extending through suitable openings provided in the bottom of the casing 1 and the lower ends thereof are bent laterally, as shown at 10 in the drawings, to provide a means whereby the same may be attached to the rear portion of the vehicle, preferably the rear fender, in any well known manner. The portions of the supporting brackets 8 which extend from the bottom of the casing 1 to the supporting members 10 thereof, provide a means for receiving and supporting a license plate. Provided on the rear portion of the lamp housing 6, is an extension 11 which has its outer edge conforming to the inner wall of the casing 1 and further providing means for supporting the lamp housing in a proper position within the casing. Adapted to be supported in the lamp housing 6, in the well known manner, is the electric bulb 12.

Extending through the center of the casing 1 and through the lamp housing 6 supported therein, is the shaft 13. A shutter member 14 is adapted to be pivotally mounted within the casing 1 and to this I provide the same with the rearwardly extending arms 15, the ends of which are adapted to have openings therein for engagement with the longitudinally extending shaft 13. These rearwardly extending arms 15 formed at the ends of the shutter 14 extend or are positioned adjacent the end walls of the lamp housing 6. The shutter 14 is preferably curved so as to conform to the contour of the casing and normally is adapted to be positioned over the opening 4 provided in the front wall of the casing and is provided with an opening 16 arranged centrally therein whereby the same forms a tail light when in position over the opening 4 in the casing, it being understood of course that in the night time, the electric bulb 12 in the lamp housing 16 is lit, and the light therefrom will be emitted through the transparent covering 7 and through the opening 16 in the shutter 14.

The rearwardly extending arms of the shutter plate 14 are provided with suitable notches 17 adjacent the shutter plate 14 for the purpose to be presently described. As is also shown more clearly in Figures 2 and 3 of the drawings, the shutter plate 14 is adapted to extend adjacent the inner wall of the casing 1. Also pivotally supported within the casing 1 and adapted to cooperate with the shutter plate 14 are the signal elements 18, 19 and 20 respectively.

Each of the signals 18, 19 and 20 respectively are provided at their ends with the rearwardly extending arms 21, 22 and 23 respectively. The arms of each of the signal members are also provided with suitable alining openings such as are shown at 24 in the drawings whereby the same may be supported on the longitudinally extending shaft 13. It is to be understood that the signal elements are disposed within each other in such a manner as to have the arms 23 of the signal member 20 extending adjacent the arms 15 of the shutter plate 13, the signal member 19 extending over the signal 20 and having the arms thereof extending adjacent the outer sides of the arms of the signal 20 and the outermost signal 18 extending over the signal 19 and having the arms 21 thereof extending beyond the outer faces of the arms 22 of the intermediate signal member. This construction is clearly shown in the drawings. One of the arms of each of the signal members is provided with an extension such as is shown in Figures 2 and 4 of the drawings whereby means is provided for enabling the same to be connected to the operating cables hereinafter to be more fully described.

The signal members are also curved to conform to the contour of the casing 1 and are of such a width or height as to cooperate with the height or width of the opening 4 provided in the casing 1 when the signal member is moved in position with respect thereto. The signal member 18 has formed therein the word "Right", the signal member 19 has the word "Stop" formed therein, and the signal member 20 has the word "Left" formed therein. As the signal members are preferably formed of metal, the indicia will consequently have to be cut therefrom.

Connected to the extension 25 formed on one of the arms 21 of the signal member 18, is the actuating cable, preferably formed of wire, 28. Similar cables 29 and 30 respectively, are connected to the outer ends of the extensions 26 and 27 respectively, provided on the arms 22 and 23 of the signal members 19 and 20 respectively. These cables are further adapted to extend through a suitable tubing 31 supported in an opening provided in the bottom of the casing in the rear portion thereof are connected at their opposite ends to the levers, to be presently described.

Mounted in the foot board on the under side thereof as clearly shown in Figure 5 of the drawings, is the plate 32 and the same has a downwardly extending pair of arms 33 provided thereon, the outer ends of which are adapted to support the shaft 34 and the block 35 directly below the shaft. Supported on the shaft 34 are the levers 36 and 37 respectively, the upper ends of which are connected to the cables 28 and 30, the inner ends of the cables extending through suitable guides 38 which are formed on the under face of the plate 32 in the manner as clearly shown in Figure 5 of the drawings. For the purpose of holding the levers 36 and 37 in their normal positions, I have provided the flat springs 39 and 40 respectively, the lower ends of which are fastened to the block 35 and the upper ends of which are adapted to engage the levers 36 and 37 respectively. The cable 29 which is connected to the stop signal 19 is adapted to be connected to the brake pedal A and a suitable coil spring or the like such as is shown at 41 in the drawings is connected with the cable 29 for normally keeping the stop signal in inoperative position. It is to be also understood that the cable 29 is connected to a lever similar to the levers 36 and 37 mounted on the shaft 34. A flat spring is also adapted to be associated with the lever which is connected to the cable 29.

Cooperating with the upper ends of the levers which are connected to the cables 28, 29 and 30 respectively, are similar cables, the opposite ends of which are connected to the operating mechanism, the construction of which will be readily apparent. A suitable elongated housing 42 is positioned below the foot board of the vehicle and is provided with an elongated slot 43 in one face thereof through which is adapted to extend the forward end of a lever 44. The inner end of the lever 44 is pivotally supported on the transversely extending pin 45 which extends between the side walls of the elongated casing or housing 42. A similar lever 46 has its inner end also pivotally supported on the transverse pin 45, the outer end of the lever 46 extending through the opposite side of the casing 42, as clearly shown in Figure 7 of the drawings. The outer ends of the levers 44 and 46 respectively, are connected by suitable cables or the like such as are shown at 47 and 48 to the upper ends of the levers 36 and 37. For the purpose of actuating the levers 44 and 46, I provide the elongated rod 49 which extends longitudinally through suitable alining openings provided in the casing 42 and upwardly through the floor board, the upper end extending along the steering column B to a point within easy access to the operator of the vehicle. A suitable housing such as is shown at 50 in the drawings is adapted to extend around the upper portion of the elongated rod 49, and as is clearly shown in Figure 7 of the drawings, the upper end of the elongated rod 49 is receivable in a suitable casing 51 which is clamped around the steering column B in any suitable manner. This casing 51 has a suitable opening 52 provided therein through which is adapted to extend the handle 53, the inner end of which is connected to the upper end of the rod 49 whereby the operator of the vehicle may readily place the rod to control the movement of the lever when it is desired to actuate the signal plate 18 or 20, respectively. The portion of the elongated rod 49 which extends in the casing 42 is provided with extensions 54 and 55 respectively, in the manner as clearly shown in Figure 8 of the drawings, and it will be readily seen that the extension 54 engages the upper edge of the lever 46 whereas the extension 55 engages the lower edge of the other lever 44.

The operation of my improved direction indicator may be briefly stated as follows. Normally the signal plates are in the position as shown in Figure 2 of the drawings, wherein the shutter 14 is in registry with the opening 4 provided in the casing 1 so that while the automobile is running in a straight direction, no signal is necessary to be given, and hence only the tail light will be visible. Simultaneously the signal plates will be disposed in the manner shown in Figure 2 so that the rays of light from the electric bulb 12 in the lamp housing 6 will be emitted through the cut out portions provided in each of the signal plates whereas to direct the rays of light through the opening 5 in the bottom of the casing, onto the license plate supported by the supporting bracket 8, when the automobile is in use during the night.

Should the operator of the vehicle desire to make a right hand turn, the handle 53 is actuated in such a manner as to simultaneously cause the action of the lever to which the cable 28 is connected, whereby the upper edge of the signal 18 will engage the lower edge of the shutter 14, move the same upwardly within the casing 1 so as to bring the shutter member out of position with respect to the opening 4 and simultaneously move the signal member 18 into position over the opening 4 so as to display the word "Right" whereby the vehicle in the rear of the vehicle upon which the device is mounted may readily ascertain the direction in which the vehicle is to travel. Upon the release of the handle 53, the spring 39 quickly returns the signal member 18 to its normal position and by gravity the shutter plate 14 will again assume its position over the opening 4. When the operator of the vehicle is desirous of making a left hand turn, the handle 53 is actuated in the reverse direction so as to cause the simultaneous action of the lever to which the cable 30 is connected whereby the upper edge of the signal member 20 will engage the notches 17 provided in the lower portions of the arms 15 of the shutter plate 14 whereby the shutter plate will again be raised out of engagement with the opening 4 and simultaneously bring the indicia on the signal 20 into position over the opening 4 whereby the word "Left" will be visible through the casing. The spring 40 will return the signal member 20 and the shutter plate 14 to their normal positions when the handle 53 is released, after the proper turn has been made in the left direction. When the vehicle is about to be brought to a stop, the action of the foot brake will simultaneously cause the movement of the signal plate 19 which has the word "Stop" formed thereon, the upper edge of this last mentioned signal plate will engage the notch 17 whereby the shutter 14 may be raised so as to bring the word "Stop" into position over the opening 4 thereby giving the proper signal to the vehicles in the rear that the vehicle upon which the device is attached is about to stop.

To prevent the signal members and shutter plate 14 from moving more than the desired movement, the guides 38 have their lower ends forming stops for limiting the swinging movements of the levers to which are connected the actuating cables 28, 29 and 30 respectively, thereby limiting the swinging movement of the signal members within the casing 1.

It will thus be seen from the foregoing description, that a combined tail light and vehicle direction indicator has been provided which is very economical, and the construction of which is such as to prevent any confusion in the displaying of the proper signal in accordance with the motion of the vehicle upon which the same is supported. Furthermore, by providing a device of the above mentioned character, the same may be easily actuated by the operator of the vehicle and the signal members which are operated independently of each other will be brought into proper position so as to give the vehicles in the rear of the machine upon which the device is attached, sufficient warning to indicate the course of travel of the machine carrying the signal thereby preventing any possibility of an accident.

While I have shown the preferred embodiment of my invention, it is to be understood that various changes in the size, shape and arrangement of parts may be resorted to without departing from the spirit of the invention and the scope of the appended claims.

Having thus described my invention, what I claim is:

A direction indicator comprising a bracket, a lamp housing mounted upon the bracket and having means for supporting a number plate, a bulb disposed within the housing, a cylindrical casing supported from the housing and having its end walls spaced from the end walls of the housing, said casing being provided at its side with an opening which is disposed opposite the plate supporting means of the housing, shutter members nested one within the other and having openings adapted to be moved to register with the opening in the casing, said shutter members having angularly disposed arms which are pivotally connected with the housing at the end walls thereof and which are disposed in the spaces between the end walls of the housing and the end walls of the casing and pull cables connected with the arms and passing through the side of the casing.

In testimony whereof I affix my signature.

RALPH A. GUYMON.